(12) United States Patent
Ozawa et al.

(10) Patent No.: US 9,162,196 B2
(45) Date of Patent: Oct. 20, 2015

(54) CLOSED-TYPE RUBBER KNEADER KNEADING EFFICIENCY EVALUATION METHOD

(71) Applicant: The Yokohama Rubber Co., LTD., Minato-ku, Tokyo (JP)

(72) Inventors: Osamu Ozawa, Hiratsuka (JP); Yasuaki Shinoda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/380,047

(22) PCT Filed: Jan. 30, 2013

(86) PCT No.: PCT/JP2013/052049
§ 371 (c)(1),
(2) Date: Aug. 20, 2014

(87) PCT Pub. No.: WO2013/125313
PCT Pub. Date: Aug. 29, 2013

(65) Prior Publication Data
US 2015/0036449 A1 Feb. 5, 2015

(30) Foreign Application Priority Data

Feb. 20, 2012 (JP) .................................. 2012-033776

(51) Int. Cl.
*B01F 15/00* (2006.01)
*B29B 7/88* (2006.01)
(Continued)

(52) U.S. Cl.
CPC ............. *B01F 15/00201* (2013.01); *B01F 7/00* (2013.01); *B29B 7/183* (2013.01);
(Continued)

(58) Field of Classification Search
CPC ........ B29B 7/186; B29B 7/246; B29B 7/005; B29B 7/183; B29B 7/28; B29B 7/283; B29B 7/286; B29B 7/263; B29B 7/88; B01F 2215/0049; B01F 15/00201; B01F 7/00; B29K 2507/04; B29K 2007/00
USPC ................ 366/142, 189, 192, 194–196, 76.1, 366/76.2, 76.93, 76.7, 76.8, 77, 96, 97; 425/204, 208, 209
See application file for complete search history.

(56) References Cited

U.S. PATENT DOCUMENTS 3,991,984 A * 11/1976 Porter .............................. 366/72
3,999,046 A * 12/1976 Porter ............................. 702/44
(Continued)

FOREIGN PATENT DOCUMENTS

DE          901309 C  *  1/1954
EP          272338 A1 *  6/1988
(Continued)

OTHER PUBLICATIONS

International Search Report dated Feb. 26, 2013, 4 pages, Japan.
(Continued)

*Primary Examiner* — Charles Cooley
(74) *Attorney, Agent, or Firm* — Thorpe North & Western

(57) ABSTRACT

When kneading kneading materials that include raw rubber and carbon black in a closed-type rubber kneader, the extent of the kneading efficiency of the closed-type rubber kneader is evaluated in accordance with the magnitude of the evaluation index calculated from unit work/total amount of shear by calculating an evaluation index calculated by a calculation device based on a total amount of shear obtained by integrating the shear velocity applied to the kneading materials by a rotor that is being driven to rotate by the rotor drive unit of the kneader over the kneading time, and a unit work obtained by dividing the integrated power obtained by integrating the instantaneous power of the rotor drive unit over the kneading time by the mass of the kneading materials.

8 Claims, 5 Drawing Sheets

(51) Int. Cl.
  *B29B 7/18* (2006.01)
  *B29B 7/24* (2006.01)
  *B29B 7/26* (2006.01)
  *B29B 7/28* (2006.01)
  *B01F 7/00* (2006.01)
  *B29K 7/00* (2006.01)
  *B29K 507/04* (2006.01)

(52) U.S. Cl.
  CPC ............... *B29B 7/246* (2013.01); *B29B 7/263* (2013.01); *B29B 7/283* (2013.01); *B29B 7/88* (2013.01); *B01F 2215/0049* (2013.01); *B29K 2007/00* (2013.01); *B29K 2507/04* (2013.01)

(56) References Cited

U.S. PATENT DOCUMENTS

| | | | |
|---|---|---|---|
| 4,076,220 A * | 2/1978 | Nakashima et al. | 366/69 |
| 4,455,091 A * | 6/1984 | Bamberger et al. | 366/76.7 |
| 4,818,113 A * | 4/1989 | Patel | 366/76.2 |
| 4,830,506 A * | 5/1989 | Borzenski | 366/76.2 |
| 5,324,107 A * | 6/1994 | Tanaka et al. | 366/76.3 |
| 6,817,748 B2 * | 11/2004 | Campanelli et al. | 366/76.2 |
| 6,908,221 B2 * | 6/2005 | Proni et al. | 366/76.7 |
| 7,314,305 B2 * | 1/2008 | Proni et al. | 366/145 |
| 8,047,701 B2 * | 11/2011 | Naoi | 366/76.7 |
| 2002/0159327 A1 * | 10/2002 | Proni et al. | 366/76.7 |
| 2003/0018113 A1 | 1/2003 | Nakahama et al. | |
| 2004/0085851 A1 * | 5/2004 | Campanelli et al. | 366/76.7 |
| 2014/0249250 A1 * | 9/2014 | Miyasaka | 523/351 |
| 2015/0036449 A1 * | 2/2015 | Ozawa et al. | 366/69 |
| 2015/0117134 A1 * | 4/2015 | Ozawa et al. | 366/100 |

FOREIGN PATENT DOCUMENTS

| | | |
|---|---|---|
| JP | H05-138649 | 6/1993 |
| JP | 2001-277236 | 10/2001 |
| JP | 2005-262725 | 9/2005 |
| JP | 2013169668 A * | 9/2013 |
| WO | WO 01/57493 | 8/2001 |
| WO | WO 2014155965 A1 * | 10/2014 |

OTHER PUBLICATIONS

Kazuo Nishimoto et al., Spectral Analysis of Electric Power Consumption Chart, 1992, 8 pages, Nippon Gomu Kyokaishi, vol. 65, No. 8, pp. 465-472, Japan.

* cited by examiner

CLOSED-TYPE RUBBER KNEADER KNEADING EFFICIENCY EVALUATION METHOD

TECHNICAL FIELD

The present technology relates to a closed-type rubber kneader kneading efficiency evaluation method, and more particularly relates to a closed-type rubber kneader kneading efficiency evaluation method capable of simply and accurately determining the extent of the kneading efficiency of a kneader.

BACKGROUND

When manufacturing rubber products such as tires, rubber hose, or the like, kneading materials that include various constituent materials such as, for example, raw rubber, carbon black, and the like, are placed in a closed-type rubber kneader and kneaded. As a result of this kneading, each of the constituent materials is uniformly dispersed within the raw rubber, and the viscosity of the kneading materials is reduced to a constant viscosity. Two rotors are disposed in parallel within a chamber in the closed-type rubber kneader, and these rotors are rotated to knead the kneading materials. The kneading materials are rotated about the rotor shaft as center, and are kneaded by a shear force applied between the rotor and the inner wall face of the chamber.

There are various types of closed-type rubber kneader with different specifications of rotor, rotor drive motor, chamber, and the like. In order to carry out kneading efficiently, it is desirable that a kneader suitable for the kneading materials is selected and used, or if an existing rubber kneader is used, preferably the kneading is carried out under conditions suitable for the kneading materials.

The method using the power-time curve of the kneader is known as a means for evaluating the state of kneading of a closed-type rubber kneader (for example, see Kazuo NISHIMOTO, Masaaki URABE, Tetsuo AKIYAMA: "Spectral Analysis of Power-Time Curve", Nippon Gomu Kyokaishi, Vol. 65, No. 8, pp 465-472, 1992, hereinafter referred to as "Nishimoto"). However, the method in this document is mainly for determining the state of kneading at a certain point in time, and it is not for evaluating the kneading efficiency of a closed-type rubber kneader.

Therefore, Nishimoto is not directly of reference for determining what specification of kneader is suitable for efficiently kneading certain kneading materials, or, for determining under what conditions they can be efficiently kneaded. Accordingly, there is a demand for a method capable of evaluating simply and accurately the kneading efficiency of a closed-type rubber kneader.

SUMMARY

The present technology provides a closed-type rubber kneader kneading efficiency evaluation method capable of simply and accurately determining the extent of the kneading efficiency of a kneader.

The closed-type rubber kneader kneading efficiency evaluation method according to the present technology is a closed-type rubber kneader kneading efficiency evaluation method when kneading kneading materials that include raw rubber and carbon black, comprising: evaluating the kneading efficiency of the kneader in accordance with the magnitude of an evaluation index calculated based on a total amount of shear obtained by integrating the shear velocity applied to the kneading materials by a rotor of the kneader over the kneading time, and a unit work obtained by dividing the integrated power obtained by integrating the instantaneous power required to drive the rotation of the rotor over the kneading time by the mass of the kneading materials.

When kneading kneading materials that include raw rubber and carbon black using a closed-type rubber kneader, the present technology evaluates the kneading efficiency of the kneader in accordance with the magnitude of the evaluation index calculated based on the total amount of shear applied to the kneading materials by the rotor of the kneader, and the unit work. The total amount of shear is a value obtained by integrating the shear velocity due to the rotor over the kneading time, and is the so-called work input when kneading. The total amount of shear can be obtained by approximation to good accuracy from the rotor external diameter, the chamber inner diameter, the rate of rotation of the rotor, and the kneading time.

Also, the unit work is a value obtained by dividing the integrated power calculated by integrating the instantaneous power required to drive the rotation of the rotor over the kneading time, by the mass of the kneading materials, and is the so-called work output when kneading. The unit work can be determined by measurement.

Then, the kneading efficiency is the work output relative to the work input when kneading, and these works can be easily determined as described above, so according to the present technology, it is possible to simply and accurately determine the extent of the kneading efficiency of a kneader.

Here, for example, the kneading efficiencies of a plurality of kneaders can be compared by comparing the evaluation index when the same kneading materials are kneaded in a plurality of kneaders with different specifications under the same conditions and to the same state. More specifically, it is possible to compare the kneading efficiencies of kneaders, even with different arrangements of rotors, such as tangential type, geared type, and the like, or different forms of rotors, such as number, blades, or the like. The kneading efficiencies under a plurality of conditions can be compared by comparing the evaluation index when the same kneading materials are kneaded in kneaders with the same specification under the plurality of different conditions and to the same state. Or, the kneading efficiencies of a plurality of kneading materials can be compared by comparing the evaluation index when the plurality of kneading materials with different mixes are kneaded in kneaders with the same specification under the same conditions and to the same state. Also, in the present technology, the kneading efficiency time history can be determined by successively calculating the evaluation index.

DETAILED DESCRIPTION

Figure 1:
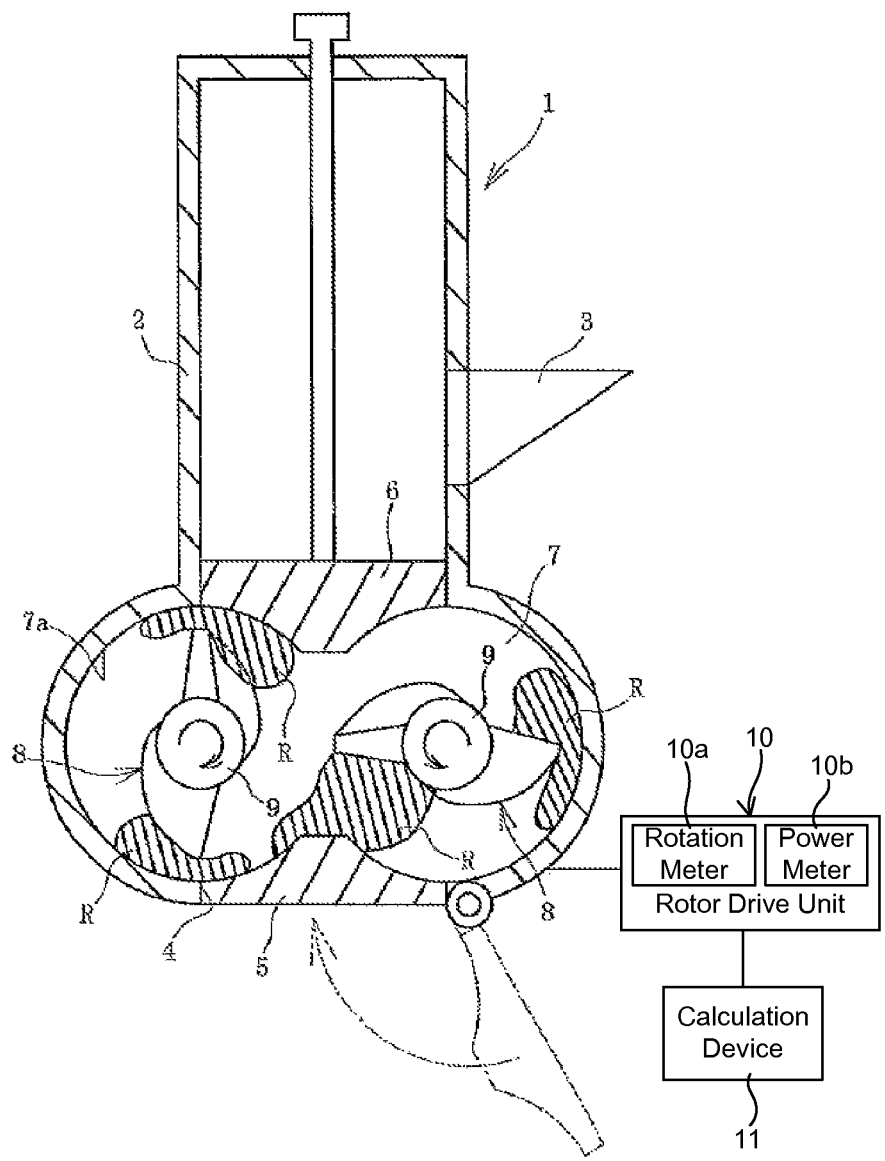
FIG. 1 is a vertical cross-sectional view illustrating the inside of a closed-type rubber kneader that kneads kneading materials.

The following is a description of the closed-type rubber kneader kneading efficiency evaluation method according to the present technology based on embodiments illustrated in the drawings.

Figure 2:
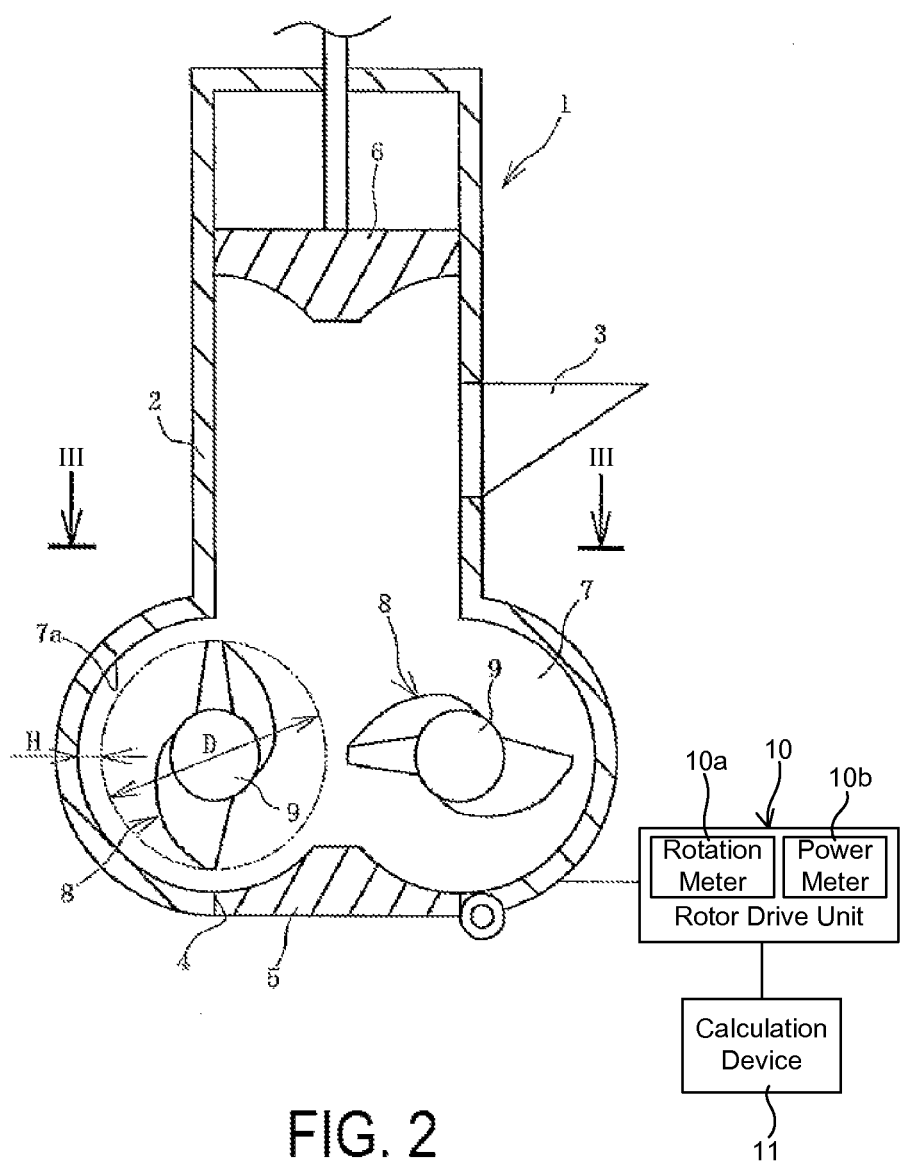
FIG. 2 is a vertical cross-sectional view illustrating the internal structure of the closed-type rubber kneader illustrated in FIG. 1.
Figure 3:
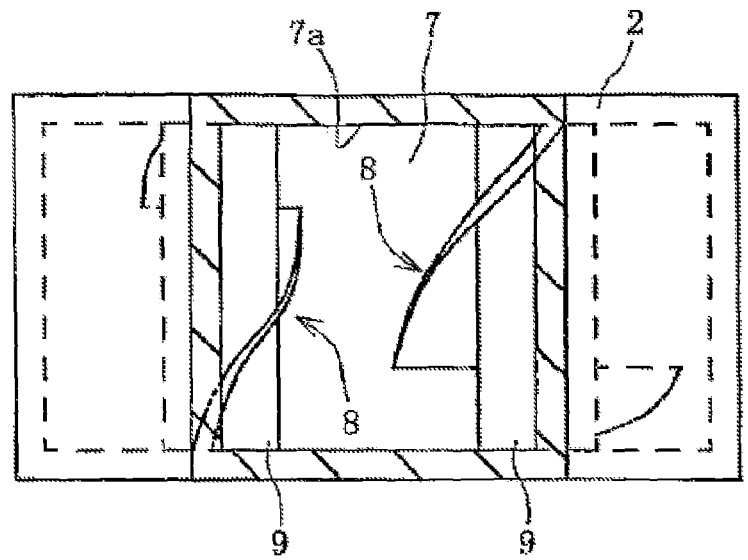
FIG. 3 is a cross-sectional view taken along III-III of FIG. 2.

As illustrated in FIGS. 1 to 3, a closed-type rubber kneader 1 (hereinafter, referred to as kneader 1) includes a material feeding port 3 disposed partway in the vertical direction of a casing 2, and a chamber 7 that houses rotors 8 and a material discharge port 4 in the lower portion of the casing 3.

Two rotors 8 disposed in parallel are provided in the chamber 7. The two parallel rotors 8 disposed in parallel are driven to rotate in opposite directions about their respective rotor shafts 9 which are disposed in parallel. There is no particular limitation on the form of the rotor 8, and various types of form can be adopted, such as tangential type, geared type, or the like. The rotors each have two rotor blades, but the number of blades and their form are determined as necessary.

A floating weight 6 that moves vertically is provided above the rotors 8. The floating weight 6 is arranged in an upward standby position so as not to obstruct the feeding of the kneading materials R when the kneading materials R are fed into the casing 2. After the kneading materials R have been fed into the casing 2, the floating weight 6 is moved downward from the standby position, and arranged in a position that covers the top of the rotors 8 and virtually closes the chamber 7. The kneading materials R include raw rubber and carbon black, and in addition include reinforcing agent other than carbon black, filler, antiaging agent, processing aids, softener, plasticizer, vulcanizing agent, vulcanization accelerator, vulcanization retarder, and the like as appropriate.

When the kneading materials R are being kneaded, the material discharge port 4 provided in a position below the rotors 8 is closed by a discharge port flap 5. When the kneaded kneading materials R are discharged from the material discharge port 4, the material discharge port 4 is opened by moving the discharge port flap 5 to a standby position where it will not obstruct discharge of the kneading materials R. The structures of the floating weight 6 and the discharge port flap 5 are not limited to the structures illustrated. A mixing machine with a so-called kneader structure may be used.

A drive motor or the like, for example, may be used as a rotor drive unit 10 that drives the rotation of the rotor shaft 9. The rotor drive unit 10 includes a rotation meter 10a and a power meter 10b. The rotation meter 10a measures the rate of rotation N of the rotor 8 (rotor shaft 9), and the power meter 10b measures the instantaneous power p required to drive the rotation of the rotor 8.

The data measured by the rotation meter 10a and the power meter 10b are input to a calculation device 11 that is configured from a computer or the like, connected to the rotor drive unit 10. Data on the external diameter D of the rotor 8, and the clearance H between the position of the external diameter of the rotor 8 and the inner wall face of the chamber 7 are input to the calculation device 11.

When the kneading materials R are being kneaded, the total amount of shear J indicated by the following equation (1) is calculated by the calculation device 11. In other words, the total amount of shear J is calculated by integrating the shear velocity γ applied to the kneading materials R by the rotor 8 that is being driven to rotate, over the kneading time T.

$$\text{Total amount of shear } J = \int (\gamma) dt \tag{1}$$

Here, the shear velocity γ=shear coefficient K×rate of rotation N of rotor, and the shear coefficient K=π×rotor external diameter D/clearance H.

Also, the calculation device 11 calculates the unit work UW indicated by the following equation (2). In other words, the unit work UW is calculated by dividing the integrated power W obtained by integrating the instantaneous power p required to drive the rotation of the rotors 8 over the kneading time T, by the mass M of the kneading materials R.

$$\text{Unit work } UW = \text{integrated power } W/\text{Mass of mixing materials } M \tag{2}$$

Here, the integrated power $W = \int (p) dt$.

Also, the calculation device 11 calculates an evaluation index E by dividing the unit work UW by the total amount of shear J, as shown in the following equation (3).

$$\text{Evaluation index } E = \text{unit work } UW/\text{total amount of shear } J \tag{3}$$

The total amount of shear J is the so-called amount of work input when kneading. Also, the total amount of shear J can be obtained by approximation to good accuracy by substituting the rotor outer diameter D, the clearance H (or the inner diameter of the chamber 7), the rate of rotation N of the rotor, and the kneading time T into equation (1). Also, the unit work UW is the so-called amount of work output when kneading. The unit work UW can be determined by measurement by the power meter 10b.

Therefore, the value of the evaluation index E is the amount of work output relative to the amount of work input when kneading. Here, the total amount of shear J is a virtual value calculated by approximation, and the actual total amount of shear Jr is Jr=kneading efficiency β×total amount of shear J. The kneading efficiency β is a value that varies in accordance with the specification and the like of the rotors 8, and is greater than 0 and less than or equal to 1. Also, if equation (3) is modified, the following equation (4) is obtained.

$$\text{Evaluation index } E = \text{kneading efficiency } \beta \times (\text{unit work } UW/\text{actual total amount of shear } Jr) \tag{4}$$

Provided the mixing proportions of the kneading materials R are the same, the kneading materials R after kneading obtained by a predetermined input of kneading will be the same, so the value of "unit work UW/actual total amount of shear Jr" is considered to be a constant (characteristic value) of that mix of kneading materials R. Accordingly, the evaluation index E indicates the extent of the kneading efficiency, and the larger the number the better the kneading efficiency. The evaluation index E can be easily calculated from the above equation (1), equation (2), and equation (3), so it is possible to simply and accurately determine the extent of the kneading efficiency of the kneader 1.

The following is the procedure for kneading the kneading materials R using the kneader 1.

First, a predetermined quantity of raw rubber, carbon black, and various other constituent materials are fed into the casing 2 through the material feeding port 3. Then, the floating weight 6 is moved downward from the standby position and arranged so as to close and cover the top of the rotors 8.

In this state, the kneading materials R that have been fed are kneaded by the two rotors 8 that are driven to rotate within the space enclosed by the inner wall face 7a of the chamber 7, the discharge port flap 5, and the floating weight 6. Also, for example, after the initial raw rubber has been kneaded, successively softener or plasticizer, and carbon black are fed into the casing 2 (chamber 7) and kneaded. After the kneading materials R have been kneaded to a predetermined state and the kneading is completed, the material discharge port 4 is opened by moving the discharge port flap 5 to the standby position, and the kneading materials R are discharged outside the kneader 1.

From the time of commencement of kneading of the kneading materials R until the time of completion of kneading, the rate of rotation N of the rotors 8 (rotor shaft 9) is successively measured by the rotation meter 10a, and the instantaneous power p required to drive the rotation of the rotors 8 is successively measured by the power meter 10b. The data measured by the rotation meter 10a and the power meter 10b are input to the calculation device 11. Also, the evaluation index E is successively calculated by the calculation device 11.

Figure 4:
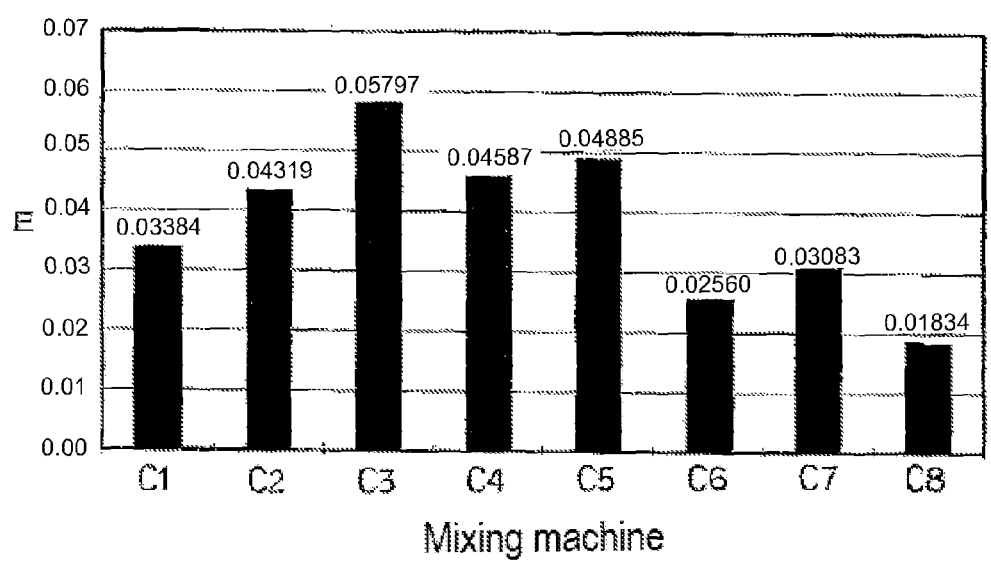
FIG. 4 is a graph showing the evaluation index for a plurality of kneaders.

FIG. 4 shows the evaluation index E when kneaders 1 with eight different specifications (model C1 to model C8) knead the same kneading materials R under the same conditions to the same state. The same conditions mean that the filling ratio which is the proportion of the volume of the chamber 7 of each of the kneaders 1 that is filled by the volume of the kneading materials R is the same, and the sequence and the timing of feeding the kneading materials is the same. The filling ratio for each of the kneaders 1 in FIG. 4 is about 60%.

From the results in FIG. 4, it can be seen that of the eight models, the kneader 1 of model C3 has the best kneading efficiency, and the kneader of model C8 has the worst kneading efficiency. From these results, if the kneader 1 is to be selected with an emphasis on kneading efficiency only, model C3 will be selected.

Figure 5:
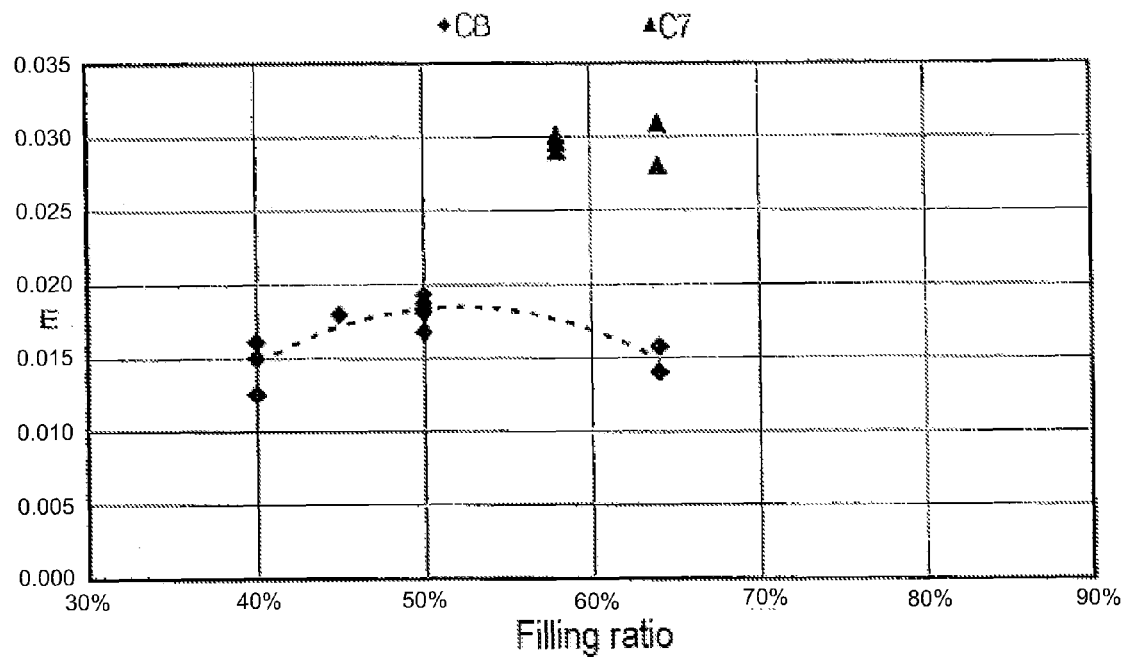
FIG. 5 is a graph showing the relationship between the filling ratio of the kneading materials in a plurality of kneaders and the evaluation index.

FIG. 5 shows the evaluation index E when kneaders 1 with two different specifications (model C7, model C8) knead the same kneading materials R, with the same feeding sequence and timing, to the same state, but with different filling ratios. From the results in FIG. 5, it can be seen that the evaluation index E does not vary greatly due to differences in the filling ratio in the kneaders 1 of model C7 and model C8, but stays within a virtually constant range. Also, it can be seen that the kneading efficiency of the kneader 1 of model C7 is better than that of the kneader 1 of model C8.

Figure 6:
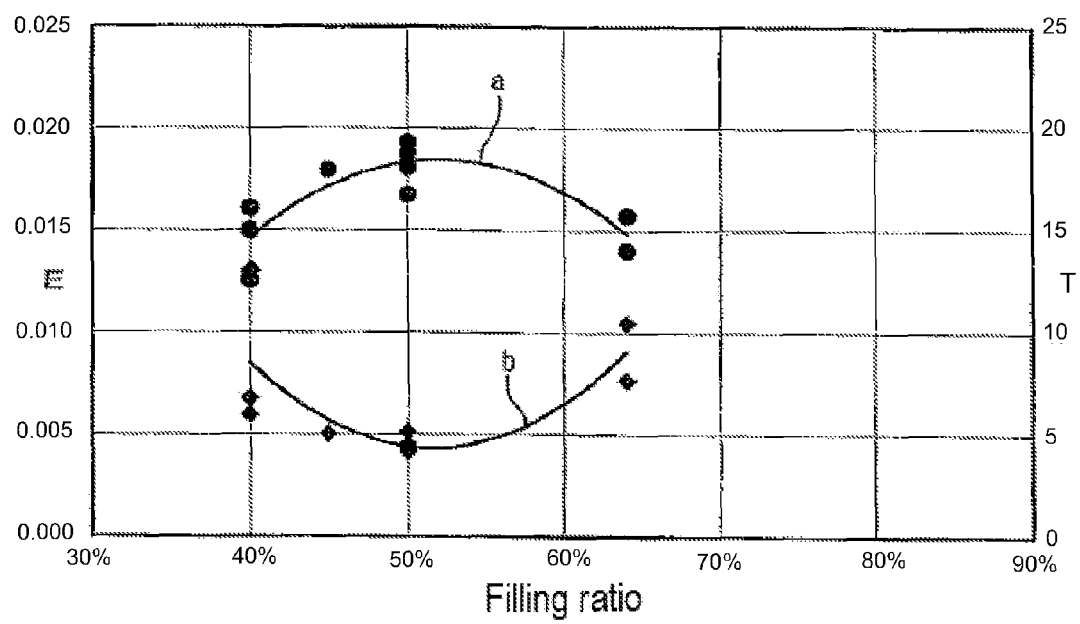
FIG. 6 is a graph showing the relationship between the evaluation index and the kneading time for filling ratios of kneading materials in a certain kneader.

FIG. 6 shows the evaluation index E (curve a) when certain kneading materials R are kneaded by the kneader 1 (model C10) to a predetermined condition with different filling ratios. Curve b shows the relationship between the filling ratio and the kneading time T (shown in minutes in FIG. 6) in this case.

By comparing the evaluation indices E, it is possible to compare the kneading efficiency of a certain kneader 1 at a plurality of filling ratios. In other words, when the same kneading materials R are kneaded by a kneader 1 of the same specification to the same state but with different filling ratios, it is possible to determine the filling ratio to enable kneading with the best efficiency. In the kneader 1 of model C10, it is possible to minimize the time required for kneading by setting the filling ratio to about 50%, and to determine that this gives the best kneading efficiency.

Figure 7:
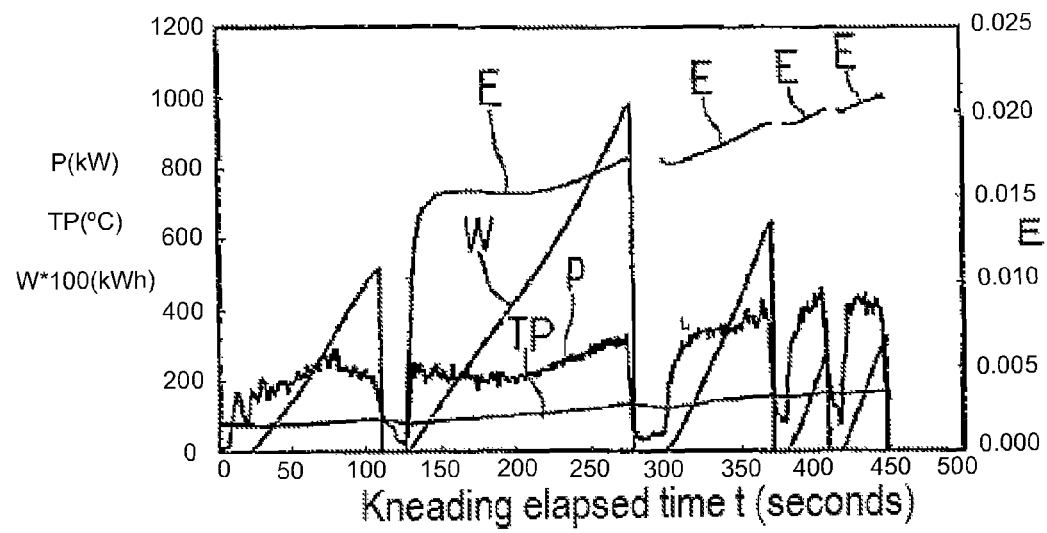
FIG. 7 is a graph showing the variation in the evaluation index with time for a certain kneader.

FIG. 7 shows the time history of the evaluation index E when certain kneading materials R are kneaded to a predetermined state with a certain filling ratio (60%) using a certain kneader 1 (model C10). The time history of the instantaneous power p, the integrated power W, and the kneading materials R temperature TP in this case are also shown. In the kneading process in FIG. 7, the kneading operation is carried out intermittently 5 times, from the start of kneading until the completion of kneading, in order to feed the various constituent materials, operate the floating weight 6, and the like, but the initial kneading operation is a preliminary kneading in which all the constituent materials have not been fed. Therefore, the present technology is applicable to the second and subsequent kneading operations (kneading operations in which all the constituent materials are fed).

From the results of FIG. 7, in the kneading by the kneader 1 of model C10, it can be seen that the evaluation index E continues to increase until the completion of kneading, the kneading materials R are slowly kneaded over a long period of time, and the kneading efficiency is not good. Also, it can be seen that the heat buildup in the kneading materials R during kneading is low.

Figure 8:
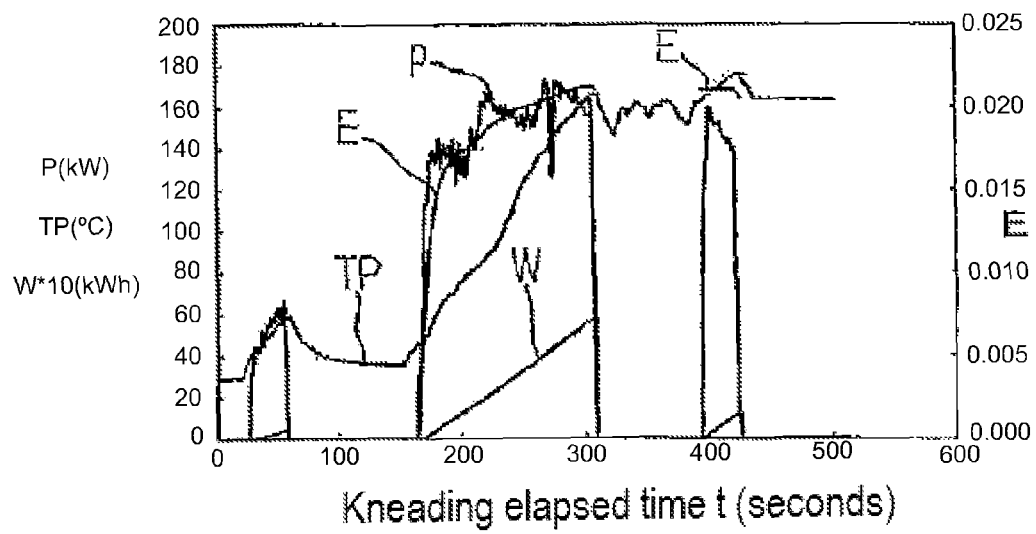
FIG. 8 is a graph showing the evaluation index time history for another kneader.

FIG. 8 shows the time history of the evaluation index E when certain kneading materials R are kneaded to a predetermined state with a certain filling ratio (50%) using a certain kneader 1 (model C11). The time history of the instantaneous power p, the integrated power W, the kneading materials R temperature TP in this case are also shown. In the kneading process in FIG. 8, the kneading operation is carried out intermittently 3 times, from the start of kneading until the completion of kneading, in order to feed the various constituent materials, operate the floating weight 6, and the like. The initial kneading operation is a preliminary kneading in which all the constituent materials have not been fed. Therefore, the present technology is applicable to the second and subsequent kneading operations (kneading operations in which all the constituent materials are fed).

From the results of FIG. 8, in the kneading by the kneader 1 of model C11, the evaluation index E suddenly increases during the kneading operation, and thereafter is virtually constant, so in a short period of time the kneading materials R have been kneaded, and it can be seen that the kneading efficiency is good. Also, it can be seen that during kneading the heat buildup in the kneading materials R is high.

From the results of FIG. 7 and FIG. 8, for example, when kneading kneading materials R that have no problems with quality even if there is high heat buildup, by selecting the kneader 1 of model C11 to carry out the kneading, it is possible to efficiently knead in a short period of time. On the other hand, when kneading kneading materials R that have problems with quality if there is high heat buildup, by selecting the kneader 1 of model C10 to carry out the kneading, it is possible to complete the kneading without lowering the quality.

If kneading materials R that have problems with quality if there is high heat buildup are kneaded in the kneader 1 of model C11, if, for example, the rate of rotation N of the rotors 8 is reduced in order to suppress the heat buildup, the kneading efficiency is reduced. In other words, the kneading conditions are set so that the evaluation index E is reduced. By successively calculating the evaluation index E in this way, and determining the kneading efficiency time history, it is possible to easily set the optimum kneading conditions.

As another evaluation method using the evaluation index E, it is possible to compare the evaluation index E for each different kneading batch (lot). In this case, the evaluation index E when the same kneading materials R are kneaded under the same conditions to the same state by a kneader 1 of the same specification is compared between kneading batches (lots). By comparing the evaluation index E for each kneading batch (lot), it is possible to determine the stability of the kneading state. In other words, the smaller the variation in the evaluation index E for each kneading batch (lot), the more it can be determined that the kneading is stable between batches (lots).

Also, if the evaluation index E when kneading the same kneading materials R under the same conditions to the same state using a kneader 1 with the same specification varies significantly, it can be determined that there is a fault (breakdown) in the kneader 1.

What is claimed is:

1. A closed-type rubber kneader kneading efficiency evaluation method when kneading kneading materials that include raw rubber and carbon black, comprising:

evaluating the kneading efficiency of the kneader in accordance with a magnitude of an evaluation index calculated based on a total amount of shear obtained by integrating a shear velocity applied to the kneading materials by a rotor of the kneader over a kneading time, and a unit work obtained by dividing integrated power obtained by integrating instantaneous power required to drive rotation of the rotor over the kneading time by a mass of the kneading materials.

2. The closed-type rubber kneader kneading efficiency evaluation method according to claim 1, wherein the kneading efficiencies of a plurality of kneaders are compared by comparing the evaluation index when same kneading materials are kneaded in the plurality of kneaders with different specifications under same conditions and to a same state.

3. The closed-type rubber kneader kneading efficiency evaluation method according to claim 2, wherein a kneading efficiency time history is determined by successively calculating the evaluation index.

4. The closed-type rubber kneader kneading efficiency evaluation method according to claim 1, wherein the kneading efficiencies of a plurality of different conditions are compared by comparing the evaluation index when the same kneading materials are kneaded in kneaders with a same specification under the plurality of different conditions and to a same state.

5. The closed-type rubber kneader kneading efficiency evaluation method according to claim 4, wherein a kneading efficiency time history is determined by successively calculating the evaluation index.

6. The closed-type rubber kneader kneading efficiency evaluation method according to claim 1, wherein the kneading efficiencies of a plurality of kneading materials are compared by comparing the evaluation index when the plurality of kneading materials with different mixes are kneaded in kneaders with a same specification under same conditions and to a same state.

7. The closed-type rubber kneader kneading efficiency evaluation method according to claim 6, wherein a kneading efficiency time history is determined by successively calculating the evaluation index.

8. The closed-type rubber kneader kneading efficiency evaluation method according to claim 1, wherein a kneading efficiency time history is determined by successively calculating the evaluation index.

* * * * *